United States Patent

[11] 3,610,844

| [72] | Inventor | Kenneth Vincent Blanchard<br>Bottisham, England |
|---|---|---|
| [21] | Appl. No. | 853,916 |
| [22] | Filed | Aug. 28, 1969 |
| [45] | Patented | Oct. 5, 1971 |
| [73] | Assignee | Tracked Hovercraft Limited<br>London, England |
| [32] | Priority | Aug. 29, 1968 |
| [33] | | Great Britain |
| [31] | | 41365/68 |

[54] ELECTRIC CURRENT COLLECTOR ARRANGEMENT
10 Claims, 5 Drawing Figs.

| [52] | U.S. Cl. | 191/45 |
|---|---|---|
| [51] | Int. Cl. | B60l 5/00 |
| [50] | Field of Search | 105/148 R, 150; 104/23 R, 23 FS, 148 LM; 191/45, 49, 57 |

[56] References Cited
UNITED STATES PATENTS

| 3,164,103 | 1/1965 | Lathers et al. | 104/23 FS |
|---|---|---|---|
| 3,460,485 | 8/1969 | Easton | 104/148 LM |
| 3,477,387 | 11/1969 | Bing | 104/23 FS |

Primary Examiner—Evon C. Blunk
Assistant Examiner—I. Kenneth Silverman
Attorney—Cameron, Kerkam & Sutton ABSTRACT: An electric current collector arrangement is shown on an electrically propelled tracked gas cushion vehicle. The vehicle has a number of gas cushion load bearing devices for supporting and guiding it from a track. Current collector shoes are mounted on a cushion member forming part of one of the load bearing devices, for contacting conductors laid along the track. The cushion member has a nozzle for forming a curtain of gas to contain the cushion and the collector shoes are mounted to contact the conductors within the gas cushion. The cushion member is movably connected to the vehicle through a secondary suspension so that the shoes are therefore isolated to some extent from movement of the vehicle.

PATENTED OCT 5 1971 3,610,844
SHEET 1 OF 2
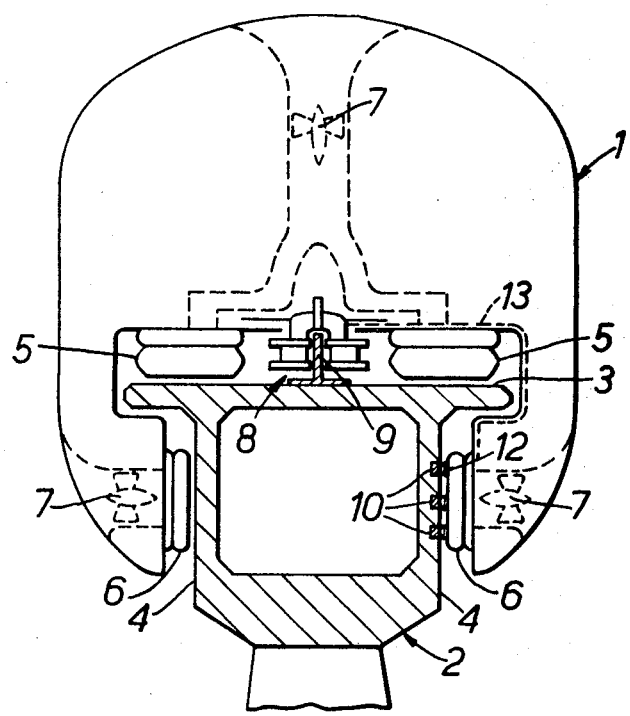
FIG.1.
FIG.5.
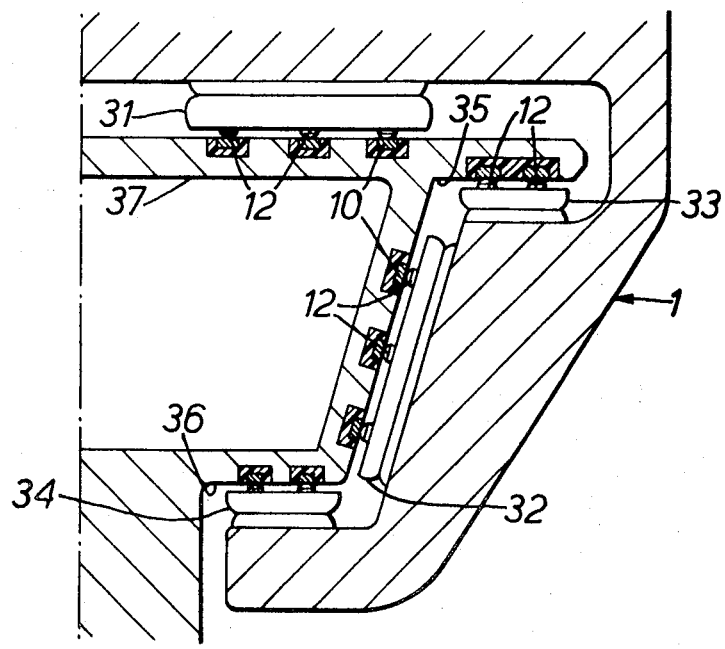

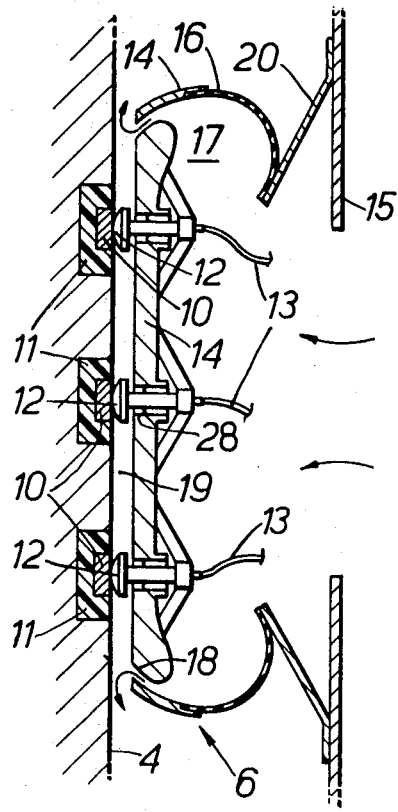
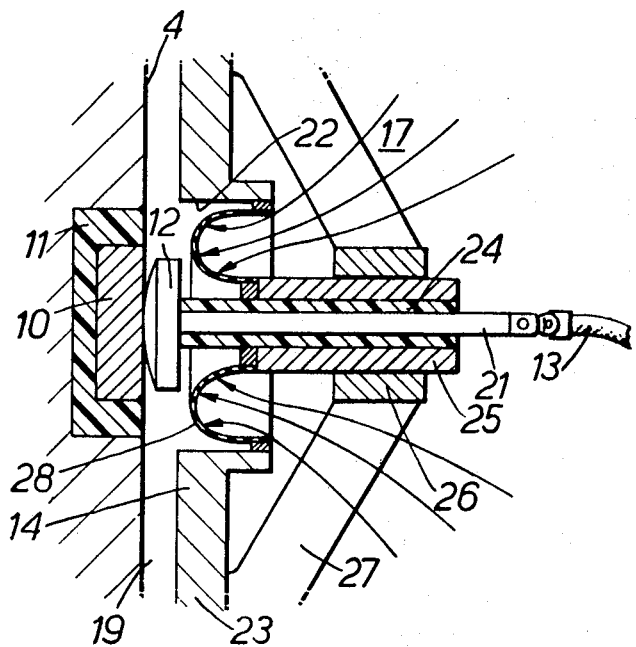
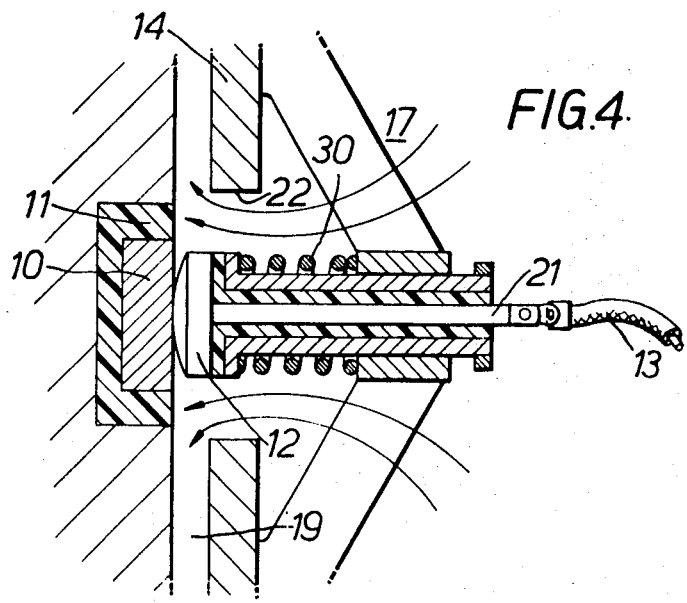

ELECTRIC CURRENT COLLECTOR ARRANGEMENT

This invention relates to electric current collector arrangements for use with vehicles requiring electric power. The invention is particularly applicable to a gas cushion vehicle for travelling along a prepared track which supports and guides the vehicle. British specification 995127 describes a gas cushion vehicle and specification 1,002,588 describes a proposal for propelling the vehicle by means of a linear electric induction motor. Such vehicles are capable of high speeds, for example greater than 200 miles an hours.

With any high speed vehicle which picks up electric current by means of a collector device as it moves along a track, there exists the problem that any movement of the vehicle transverse to the length of the track may cause the collector to separate, with consequent arcing, from the conductor with which it cooperates or to bear too heavily on the conductor with consequent excessive friction. Conventional pantograph collectors have mechanical links which allow movement of the collector device with respect to the vehicle.

According to the invention we provide the combination of an electric current collector device, a gas cushion member and a load bearing structure to which the cushion member is movably connected, the cushion member having means for containing a continuously generated cushion of gas for spacing the cushion member in use from a surface, and the device being mounted on the cushion member so that in use it contacts an electrical conductor on said surface.

The invention is particularly useful in an electrically propelled tracked gas cushion vehicle since one of the gas cushion load bearing devices which support or guide the vehicle can be modified according to the invention to incorporate a collector device and the associated conductor can be laid along the surface from which the load bearing device is spaced.

Since the gas cushion member will closely follow the surface, the collector device will also closely follow the conductor.

The cushion member may be of the plenum chamber-type having a rigid or flexible wall serving as the means to contain the cushion, but is preferably of the peripheral jet-type in which the means to contain the cushion forms a curtain of moving gas.

Preferably the collector device is mounted so that it contacts the conductor within the gas cushion. In this way, as the vehicle moves along the track, gas escaping from the cushion between the cushion and the surface will blow the conductor laid along the surface free from dust or debris and this will help to ensure that good electrical contact is made.

Most of the movement of the vehicle transverse to the track will be accommodated by relative movement between the cushion member and the load bearing structure (which forms part of the vehicle), the cushion member and the load bearing structure being movably connected together by a connection means forming a suspension for the cushion member. The cushion member is nevertheless likely to move to a small extent with respect to the supporting surface and accordingly the collector device is urged away from the cushion member and into contact with the conductor.

The collector device can be connected to the cushion member by means of a flexible membrane which is subject to a differential pressure of such a sense that the device is urged towards the conductor; alternatively, the connection between the collector device and the cushion member may include spring biassing means likewise arranged to urge the device towards the conductor.

The arrangement of the deformable chamber is preferably such that it inherently provides increasing resistance to movement of the cushion member as the cushion member approaches the load bearing structure.

Preferably a plurality of current collector devices are mounted on one cushion member.

In the accompanying drawings:

FIG. 1 is a diagrammatic cross section through a tracked gas cushion vehicle mounted on a track incorporating an embodiment of the present invention, FIG. 2 is an enlarged side view partly in cross section of part of FIG. 1, FIG. 3 is an enlarged detail of part of FIG. 2, FIG. 4 is a view similar to FIG. 3 of an alternative arrangement, and FIG. 5 is a diagrammatic cross section through part of another tracked gas cushion vehicle on its track.

FIG. 1 shows a tracked gas cushion vehicle 1 mounted on a track 2. The track 2 has a horizontal supporting surface 3 and vertical guidance surfaces 4. The vehicle 1 has a plurality of horizontal gas cushion load bearing devices 5 which support it from horizontal surface 3, and vertical gas cushion load bearing devices 6 which guide it from vertical surfaces 4. The devices 5 and 6 are fed with pressurized air by fans 7.

The vehicle 1 is propelled along track 2 by a linear induction motor having a stator 8 connected to the vehicle 1 cooperating with a reaction rail 9 fixed along the length of the track 2. The manner in which the motor functions electrically is known and will not be described.

As can be seen in FIG. 1 three electrical conductors 10 are set into one of the vertical guidance surfaces 4 so as to be substantially flush with the surface. As shown in FIG. 2 the conductors 10 are embedded in insulating material 11. Current is collected from the conductors 10 by three shoes 12 which are mounted on one of the gas cushion load bearing devices 6 which guides the vehicle so that in use they contact the conductors 10. The conductors 10 supply three phase alternating current to the shoes 12 which are connected by suitable leads 13 to the linear induction motor stator 8.

FIG. 2 shows that the gas cushion load bearing device 6 includes the combination of the electric current collector shoes 12, a rigid gas cushion member 14, and a load bearing structure 15 forming part of the vehicle to which the cushion member 14 is movably connected.

The cushion member 14 is movably connected to the structure 15 by a flexible membrane 16. The membrane 16, together with the cushion member 14 and the structure 15, defines a deformable chamber 17 which is fed with pressurized gas by a FIG. 7. The cushion member 14 has a peripheral nozzle 18, and pressurized gas flows from chamber 17 out of the nozzle 18 to form a curtain of moving gas to contain a continuously generated cushion of gas 19 which spaces the cushion member 14 from surface 4.

The flexible membrane 16 is connected to an inclined surface 20 of the structure 15 so that there is progressively increasing resistance to movement of the cushion member 14 as it approaches the structure 15 as is described in U.S. Pat. No. 3,477,387. The deformable chamber forms a suspension for the cushion member 14.

The shoes 12 are mounted on the cushion member 14 so that in use they contact the conductors 10 within gas cushion 19. FIG. 3 shows a shoe 12 in more detail. Each shoe 12 is connected to a rod 21 which extends through a hole 22 in the base 23 of the cushion member 14. The rod 21 is surrounded with insulating material 24 which is in turn surrounded by a sleeve 25. The sleeve 25 is free to move within a bearing 26 so that the shoe 12 can move towards and away from cushion member 14. The bearing 26 is connected to the base 23 by struts 27.

A flexible annular membrane 28 is connected both to the edge of the hole 22 and to the sleeve 25, as shown in FIG. 3. The gas pressure in the chamber 17 is greater than the pressure of cushion 19 and consequently the membrane 28 assumes the form shown in FIG. 3 and resiliently urges the shoe 12 away from the cushion member 14 and into contact with the conductor 10.

FIG. 4 shows an alternative arrangement for biassing a shoe 12. Instead of a membrane 28 the shoe 12 is biassed by a coil spring 30 which abuts against the bearing 26. Gas from the chamber can escape through the hole 22 into the cushion 19 and this helps to cool the shoe 12 and to keep the conductor 10 free of dust.

FIG. 5 is a diagrammatic view showing that the combination according to the invention may be mounted in several places on a tracked gas cushion vehicle. The shoes 12 are shown mounted on a vehicle supporting device 31, or on a side guidance device 32, or on gas cushion devices 33 and 34 cooperating with downwardly facing surfaces 35, 36 of the track 37. Conductors on the surfaces 35 and 36 are to some extent shielded from rain. In practice, of course, a vehicle need have the shoes only mounted on one gas cushion device. The gas cushion devices 31 and 32 are shown having three shoes each for collecting three phase alternating current, while the gas cushion devices 33 and 34 are shown having two shoes for collecting direct current which can be converted to alternating current on the vehicle.

The invention provides a particularly convenient form of current collector for a tracked gas cushion vehicle. Although the vehicle may move several inches laterally with respect to the track due to wind or aerodynamic forces acting on it, the cushion member 14 will always stay more closely spaced from the track surface.

I claim:

1. The combination of an electric current collector device, a gas cushion member, a supporting structure, and means movably connecting the cushion member and the supporting structure, the cushion member having means for containing a continuously generated cushion of gas for spacing the cushion member in use from a surface, and the collector device being so mounted on the cushion member that in use the collector device contacts an electrical conductor on said surface and is movable relative to the cushion member, the means connecting the cushion member and the supporting structure comprising a flexible membrane which, together with the cushion member and the supporting structure, defines a deformable chamber for pressurized gas forming a suspension for the cushion member.

2. The combination of an electric current collector device, a gas cushion member, a supporting structure, and means movably connecting the cushion member and the supporting structure, the cushion member having means for containing a continuously generated cushion of gas for spacing the cushion member in use from a surface, and the collector device being so mounted on the cushion member that in use the collector device contacts an electrical conductor on said surface and is movable relative to the cushion member, the means connecting the cushion member and the supporting structure comprising a flexible membrane which, together with the cushion member and the supporting structure, defines a deformable chamber for pressurized gas forming a suspension for the cushion member, and the collector device being connected to the cushion member by another flexible membrane which is subject to the pressure of the gas in the chamber so that the collector device is urged towards the conductor.

3. The combination of an electric current collector device, a gas cushion member, a supporting structure, and means movably connecting the cushion member and the supporting structure, the cushion member having means for containing a continuously generated cushion of gas for spacing the cushion member in use from a surface, and the collector device being so mounted on the cushion member that in use the collector device contacts an electrical conductor on said surface and is movable relative to the cushion member, the means connecting the cushion member and the supporting structure comprising a flexible membrane which, together with the cushion member and the supporting structure, defines a deformable chamber for pressurized gas forming a suspension for the cushion member, and the arrangement of the deformable chamber being such that in use there is increasing resistance to movement of the cushion member as it approaches the supporting structure.

4. In combination in a vehicle arranged for movement along a track having an electrical conductor extending along the length thereof, a load bearing structure, a gas cushion member, the gas cushion member having containment means for containing a load bearing cushion of pressurized gas spacing the cushion member in use from a surface of the track, gas supply means for supplying pressurized gas to the cushion, first connection means movably connecting the cushion member and the load bearing structure in spaced relation and so arranged as to produce increasing resistance to relative approaching movement of the cushion member and the load bearing structure, a current collector device, and second connection means movably connecting the current collector device and the gas cushion member and so arranged as to bias the current collector device away from the cushion member and into contact with the electrical conductor extending along the track.

5. The combination according to claim 4, wherein the current collector device is so disposed as to contact the electrical conductor within the gas cushion.

6. The combination according to claim 4, wherein the containment means is so arranged as to form a cushion containing curtain of moving gas.

7. The combination according to claim 4, wherein the second connection means comprises a flexible membrane movably connecting the current collector device and the gas cushion member, the flexible membrane in use being subject to a differential pressure across it of a sense to cause the membrane to bias the current collector device into contact with the electrical conductor.

8. The combination according to claim 7, wherein the containment means is so arranged as to form a cushion containing curtain of moving gas, the gas supply means comprising a deformable chamber which is defined in part by the flexible membrane and from which pressurized gas passes to the gas cushion via the containment means.

9. The combination according to claim 8, wherein the current collector device is so disposed as to contact the electrical conductor within the gas cushion, the flexible membrane being subject on one side to the pressure of gas in the deformable chamber and on its other side being subject to cushion pressure.

10. The combination according to claim 4, wherein the current collector device is biassed into contact with the electrical conductor by spring biassing means.